US010302366B2

(12) United States Patent
Schatz-Knecht

(10) Patent No.: US 10,302,366 B2
(45) Date of Patent: May 28, 2019

(54) BRAZED HEAT EXCHANGER AND PRODUCTION METHOD

(71) Applicant: MODINE MANUFACTURING COMPANY, Racine, WI (US)

(72) Inventor: Wolfgang Schatz-Knecht, Ruetlingen (DE)

(73) Assignee: Modine Manufacturing Company, Racine, WI (US)

(*) Notice: Subject to any disclaimer, the term of this patent is extended or adjusted under 35 U.S.C. 154(b) by 89 days.

(21) Appl. No.: 15/517,661

(22) PCT Filed: Oct. 9, 2015

(86) PCT No.: PCT/US2015/054811
§ 371 (c)(1),
(2) Date: Apr. 7, 2017

(87) PCT Pub. No.: WO2016/057856
PCT Pub. Date: Apr. 14, 2016

(65) Prior Publication Data
US 2017/0241716 A1 Aug. 24, 2017

(30) Foreign Application Priority Data

Oct. 10, 2014 (DE) .................. 10 2014 015 170
Aug. 8, 2015 (DE) .................. 10 2015 010 310

(51) Int. Cl.
*B23K 1/00* (2006.01)
*F28D 7/16* (2006.01)
(Continued)

(52) U.S. Cl.
CPC ............ *F28D 9/005* (2013.01); *B23K 1/0012* (2013.01); *B23K 35/025* (2013.01);
(Continued)

(58) Field of Classification Search
CPC ...... F28D 9/005; F28D 7/1615; F28D 9/0043; F28D 9/0056; F28D 2021/0089;
(Continued)

(56) References Cited

U.S. PATENT DOCUMENTS 4,053,969 A   10/1977   Bayard
4,327,802 A * 5/1982   Beldam ................ F28D 1/0333
                                                    165/153
(Continued)

FOREIGN PATENT DOCUMENTS

EP   1094291 A   4/2001
EP   1153690 A1  5/2001
(Continued)

OTHER PUBLICATIONS

International Search Report and Written Opinion for Application No. PCT/US2015/054811 dated Dec. 30, 2015 (18 pages).
(Continued)

*Primary Examiner* — Justin M Jonaitis
(74) *Attorney, Agent, or Firm* — Michael Best & Friedrich LLP; Jeroen Valensa; Michael Bergnach

(57) ABSTRACT

A brazed heat exchanger includes plates that are stacked or nested to define flow channels for multiple media. Inserts are arranged within at least some of the flow channels. Two different braze alloys having compositions based on different metals are used to form braze joints between the plates and the inserts. In some cases, a copper-based braze alloy is used for joints corresponding to flow channels for one of the media in order to provide high pressure-resisting strength to those flow channels, while an iron-based braze alloy is used for joints corresponding to flow channels for another of the media where dissolved copper is undesirable.

20 Claims, 9 Drawing Sheets

(51) Int. Cl.
*F28D 9/00* (2006.01)
*F28F 1/02* (2006.01)
*F28F 1/12* (2006.01)
*F28F 3/08* (2006.01)
*F28F 3/10* (2006.01)
*F28F 9/02* (2006.01)
*B23K 35/02* (2006.01)
*B23K 35/30* (2006.01)
*F28D 21/00* (2006.01)
*F28F 21/06* (2006.01)
*F28F 21/08* (2006.01)

(52) U.S. Cl.
CPC ...... *B23K 35/0233* (2013.01); *B23K 35/0244* (2013.01); *B23K 35/302* (2013.01); *B23K 35/3053* (2013.01); *F28D 7/1615* (2013.01); *F28D 9/0043* (2013.01); *F28D 9/0056* (2013.01); *F28F 3/08* (2013.01); *F28F 3/10* (2013.01); *F28F 9/0226* (2013.01); *F28F 9/0253* (2013.01); *F28F 21/06* (2013.01); *F28F 21/082* (2013.01); *F28F 21/084* (2013.01); *F28D 2021/0089* (2013.01); *F28F 1/022* (2013.01); *F28F 1/126* (2013.01); *F28F 2255/10* (2013.01); *F28F 2255/16* (2013.01); *F28F 2275/04* (2013.01)

(58) Field of Classification Search
CPC .............. B23K 1/0012; B23K 35/0233; B23K 35/0244; B23K 35/025; B23K 35/302; B23K 35/3053; F28F 3/08; F28F 3/10; F28F 9/0226; F28F 9/0253; F28F 21/06; F28F 21/082; F28F 21/084; F28F 1/022; F28F 1/126; F28F 2255/10; F28F 2255/16; F28F 2275/04
USPC .................................. 165/166, 164, 165, 167
See application file for complete search history.

(56) References Cited

U.S. PATENT DOCUMENTS

| | | | |
|---|---|---|---|
| 4,373,243 A | | 2/1983 | Nakamura |
| 4,434,845 A | * | 3/1984 | Steeb ................. F28D 9/0062 165/153 |
| 4,949,543 A | | 8/1990 | Cottone et al. |
| 4,967,835 A | * | 11/1990 | Lefeber ................. F28D 9/0012 165/167 |
| 5,042,574 A | | 8/1991 | Cottone et al. |
| 5,102,032 A | | 4/1992 | Cottone et al. |
| 5,146,980 A | * | 9/1992 | Le Gauyer ............ F28D 9/0012 165/165 |
| 5,595,271 A | | 1/1997 | Tseng |
| 5,931,219 A | * | 8/1999 | Kull ........................ F28D 9/005 165/166 |
| 6,244,334 B1 | * | 6/2001 | Wu ....................... F28D 9/0012 165/153 |
| 6,544,662 B2 | | 4/2003 | Rabinkin et al. |
| 6,595,271 B2 | * | 7/2003 | Komoda .............. B23K 1/0012 165/133 |
| 7,685,716 B2 | | 3/2010 | Rassmus et al. |
| 2001/0047862 A1 | | 12/2001 | Anderson et al. |
| 2002/0050346 A1 | | 5/2002 | Colin et al. |
| 2004/0069837 A1 | | 4/2004 | Fujiyama et al. |
| 2007/0023175 A1 | * | 2/2007 | Richter .................. F01M 5/002 165/167 |
| 2007/0175617 A1 | * | 8/2007 | Brost .................. F02B 29/0462 165/149 |
| 2008/0078538 A1 | * | 4/2008 | Jalilevand .............. F28D 1/0333 165/170 |
| 2008/0202735 A1 | * | 8/2008 | Geskes .................. F28D 9/0006 165/166 |
| 2008/0236802 A1 | * | 10/2008 | Koepke ................... F28D 9/005 165/167 |
| 2009/0129999 A1 | | 5/2009 | Shimazu et al. |

FOREIGN PATENT DOCUMENTS

| | | |
|---|---|---|
| EP | 2746711 A1 | 6/2014 |
| JP | 2009082108 | 3/2009 |
| WO | 2005050118 A1 | 6/2005 |

OTHER PUBLICATIONS

The State Intellectual Property Office of the People's Republic of China, Notification of the First Office Action, Chinese Patent Application No. 2015800544145, dated Jul. 23, 2018.

* cited by examiner

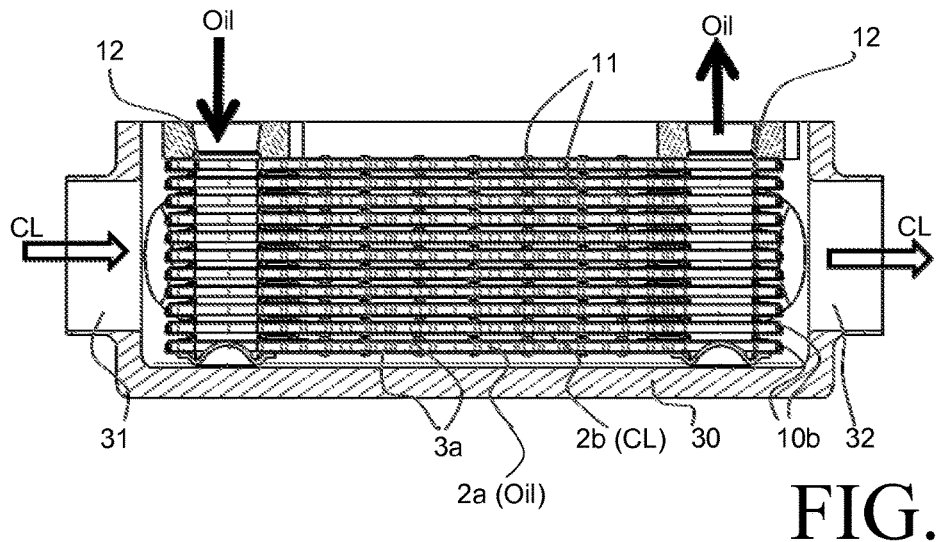
FIG. 8
FIG. 9
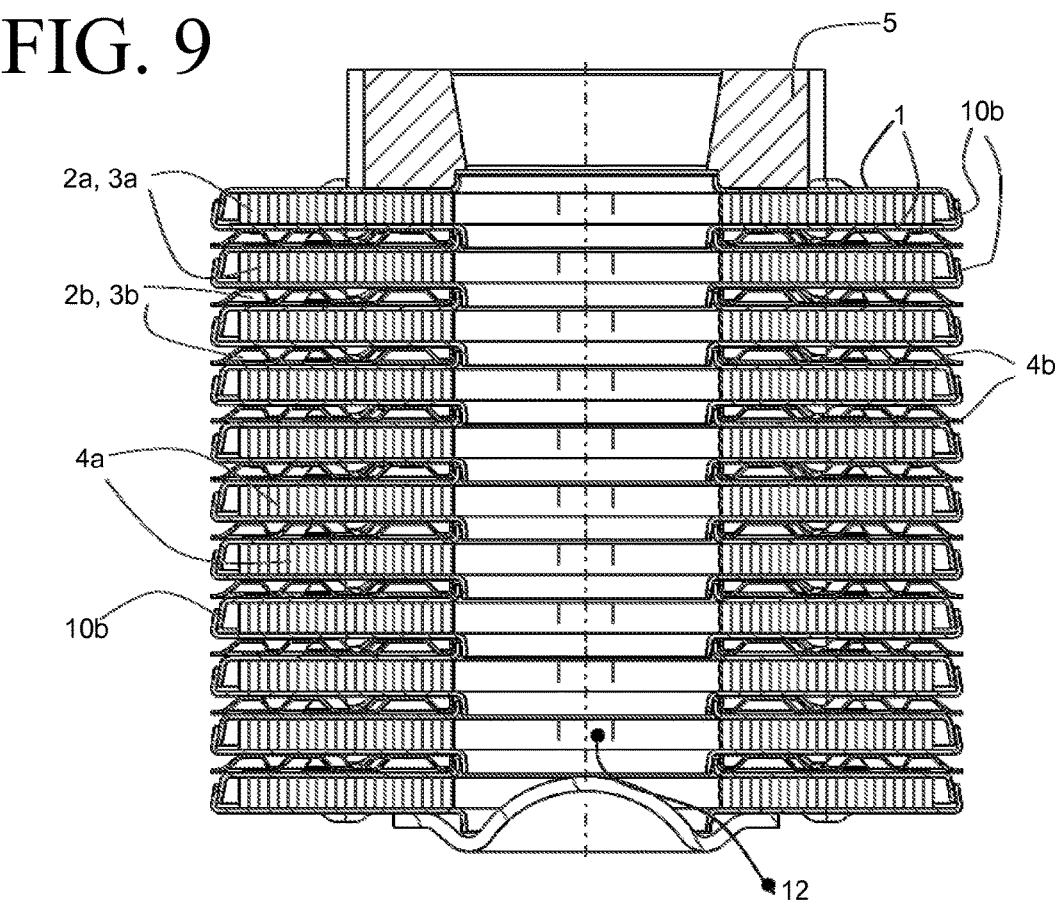

BRAZED HEAT EXCHANGER AND PRODUCTION METHOD

CROSS-REFERENCE TO RELATED APPLICATIONS

This application claims priority to German Patent Application No. 10 2014 015 170.0 filed Oct. 10, 2014, and to German Patent Application No. 10 2015 010 310.5 filed Aug. 8, 2015, the entire contents of which are hereby incorporated by reference herein.

BACKGROUND

The present invention relates to a heat exchanger brazed in a brazing furnace, comprising stacked heat exchanger plates which between them have ducts for different media, and braze material in the brazed connection seams. The invention also relates to a method for producing the same.

The type of brazed heat exchanger used herein as a basis for the introduction of improvements is, for example, known from EP 1 152 204 B1. Few details are given in that document with regard to the brazing, the type of braze alloys used, or the brazing process.

The material of the heat exchanger plates and the material of the fins arranged in the ducts are often a suitable steel, in some cases a high-grade steel.

With regard to braze materials suitable for the brazing of steel, there are, for example, Ni-based braze materials, Cu-based braze materials, Fe-based braze materials, Cr-based braze materials, and the like. In a known manner, the expression "based" expresses that the respective metal constitutes the main alloy constituent, or at least a major constituent of the braze material, in conjunction with other alloy constituents such as Mn, Mo, P and Si, to name but a few.

From DE 100 03 329 B4, for example, it is known to use two different Cr-based braze materials for the brazing of an exhaust-gas recirculation cooler. Said braze materials are either mixed before being applied, with the mixture applied to individual parts of the cooler to be brazed or to a base material, or the two braze materials are applied one on top of the other as a lower and upper layer in the form of a braze paste. Improved corrosion resistance of the exhaust-gas cooler can be achieved with such a proposal.

In EP 1 153 690 A1, to achieve the same aim, the base material is plated with three braze materials having different base substances, specifically first a Cr-based braze material, then a Ni-based braze material and finally a Cu-based braze material. The same braze materials are provided in all of the ducts of said heat exchanger, which is expedient inter alia from a manufacturing and logistical aspect. In the EP document, the use of braze pastes, braze powders or braze foils is regarded as being disadvantageous. Electrical or non-electrical plating methods are thus performed on the base material of the heat exchanger using the braze materials.

A method for producing brazed plate-type heat exchangers is known from DE 103 28 274 A1. The method provides a combination of particular welding and brazing working steps. The use of braze foils or the application of braze pastes or braze powders is also mentioned. The document also claims a number of suitable braze materials.

Finally, it is also known from practice for the two flat sides of an aluminum sheet-metal strip from which heat exchanger plates are produced to be plated with different Al-based braze materials. The braze materials are typically Al—Si-based braze materials. They differ, however, with regard to the content of certain alloy constituents. In the heat exchanger, the plates are arranged such that identical braze materials are provided on the surfaces of all of the ducts of the heat exchanger.

SUMMARY

It is an object of the invention to improve the known brazed heat exchangers described in the introduction, and to specify an advantageous method for producing the same.

Some embodiments of the invention encompass a so-called "housingless" heat exchanger in which the plates are mainly of trough-shaped form and are stacked one inside the other. Said heat exchanger plates have at least four openings which form four inlet and outlet ducts that extend through the stack. One inlet duct and one outlet duct are assigned to a respective medium.

Some other embodiments of the invention encompass a heat exchanger that has a housing in which the stack is arranged. Said stack has plate pairs, which form tubes, and fins or (alternatively) studs between the tubes or the plate pairs, with ducts in the tubes and with other ducts in which the fins or the studs are arranged, and with braze material provided in the brazed connecting seams. Said heat exchanger plates generally have only two openings in the plates, which openings form an inlet duct and an outlet duct in the plate stack for the medium flowing through the ducts in the plate pairs. The second medium flows into the housing and flows through the other ducts with the fins or the studs between the plate pairs, before subsequently exiting the housing.

Because the braze material in the ducts assigned to one medium differs from the braze material in the other ducts, which are assigned to a different medium, the heat exchanger is improved at least for certain applications from a functional aspect, and possibly also with regard to cost. In some embodiments the braze materials are particularly preferably two braze materials based on different substances.

Certain alloy constituent parts, of which it is said that they might trigger disadvantageous effects in connected circuits in dissolved form, can also be eliminated by embodiments of the invention.

In some embodiments the braze materials based on different substances are applied in the form of braze paste, braze foil or braze powder. The alternatively possible use of correspondingly plated plates and/or fins or duct sheets can be expedient under some economic conditions.

As one non-limiting example, in the case of known heat exchangers for the exchange of heat between three or more media, with three ducts correspondingly assigned to the media or with three duct groups, it would be possible to use more than two braze materials based on different substances in each heat exchanger, possibly one braze material per duct group.

In some embodiment it can be particularly advantageous for the braze materials based on different substances to preferably be (copper) Cu-based and (iron) Fe-based braze materials. In some such embodiments the base material for the heat exchanger plates and for undulating fins and undulating duct sheets that are preferably situated in the ducts is preferably a steel, in some cases a high-grade steel.

In some embodiments it can be preferable for the one brazing material to be present at least partially in an upper and/or lower channel of the first or second channels of the heat exchanger that are assigned to the first or the second medium, and that the other brazing material is arranged in the remaining first or in the remaining second channels for the same medium.

With respect to such embodiments, those first or second channels assigned to a medium do not necessarily have to be the uppermost or the lowermost channel. In general, such embodiments can have one channel or some channels on one medium side or even on both medium sides at least partially equipped with another brazing material than the other remaining channels on the respective medium side, in order to provide the heat exchanger with the advantages which are to be assigned to said other brazing material.

If the heat exchanger is used, for example, as an oil cooler, provision is made for the Cu-based braze material to be used in the ducts assigned to the oil and for the Fe-based braze material to be used in the other ducts that are assigned to a cooling liquid. In the oil cooler, higher pressures often prevail on the oil side. The Cu-based braze exhibits considerably better strength characteristics and is therefore used there.

In the case of the heat exchanger type that has the housing, it would be possible—in contrast to the housingless heat exchanger—for the Fe-base braze material to be provided in the oil ducts and the Cu-based braze material to be provided in the coolant ducts.

In some embodiments, one or more other braze materials based on different substances is additionally used to construct the heat exchanger.

In some embodiments a suitable Cu-based braze material has a Cu fraction of approximately 99% Cu or even greater.

In some embodiments a suitable Fe-based braze material contains for example 20 wt % Cr, 39 wt % Fe and 20 wt % Ni and also 10 wt % Cu, and also other alloy constituents in small amounts.

In some other embodiments a suitable Fe-based braze contains 54 wt % Fe and only 15 wt % Cr, and also 10 wt % Ni and other alloy constituents, inter alia also 5 wt % Cu.

The inventors have observed that, in the case of the mentioned uses of the heat exchanger, concerns or suspicions have arisen that some alloy constituents (for example copper, Cu) dissolve or partially dissolve, said alloy constituents then being present in the media participating in the exchange of heat and being transported through connected circuits. Some alloy constituents are said to be responsible for damage occurring in the circuits, because they trigger undesired chemical reactions.

Possible damage can be prevented by means of the heat exchangers and production methods according to some embodiments of the invention.

It has also been observed that, even though suitable Fe-based braze materials may contain up to 10% Cu (see above), no measurable copper dissolution phenomena have occurred. The inventors have speculated that a certain amount of copper is required to trigger supposedly damaging dissolution phenomena.

The brazing method provided is preferably a known, fluxless vacuum brazing method. It may however also be a brazing method that uses shielding gas.

According to some embodiments of the invention, provision is also made for the different braze materials to be configured so as to be matched to one another in terms of melting temperature ranges, required vacuum, etc., which is realized by corresponding addition of alloy constituents. For the brazing of high-grade steel, it is known that brazing temperatures above approximately 1200° C. are required. The discussed melting temperature ranges of the two braze materials must lie below that, and should be for example approximately 1100° C. They should preferably differ from one another only by +/−50° C. or less.

The method, according to one embodiment of the invention, for producing brazed heat exchangers including stacked heat exchanger plates which, in the process of the formation of the stack, form ducts for different media, wherein, in said process, undulating fins are placed into one set of ducts and undulating duct sheets are placed into the other ducts, wherein, before or during said process, braze materials are applied, and wherein finally, the heat exchanger is brazed in a brazing furnace, is characterized in that the braze material that is or has previously been applied to surfaces in one set of ducts differs from the brazing solid material that is or has previously been applied to other surfaces in the other set of ducts. Said surfaces preferably correspond to the brazed connection seams mentioned in the introduction.

As an alternative to the described method, the placement of fins and/or duct sheets may be omitted or partially omitted if studs are formed in the heat exchanger plates. In this case, the braze material is applied to the tips of the studs. It is also possible, in another alternative, for a mix of fins/duct sheets and studs to be realized in the ducts.

The expression "applied" encompasses all known techniques and methods for the arrangement of braze, that is to say: substantially the plating of the base material with braze, braze powder or braze paste applied as a braze layer, and also the introduction of braze foils in the process of the formation of the stack. In some embodiments the plating is performed already during the production of the base materials, that is to say during the production of sheet-metal strips, of the plates, of the fins, and of the duct sheets, which must take place before the production of the plate-type heat exchanger.

In some embodiments of the invention, improved strength properties of a heat exchanger are achieved by way of a heat exchanger which is brazed in a brazing furnace using at least two brazing materials. One brazing material is preferably present at least partially in an upper and/or lower channel of the first or second channels of the heat exchanger which are assigned to the first or the second medium, and the other brazing material is arranged in the remaining first or in the remaining second channels for the same medium.

In some such embodiments, the first or second channel having the one brazing material are the uppermost or the lowermost channel, but not necessarily in all embodiments. In general, one channel or some channels on one medium side or even on both medium sides are at least partially equipped with another brazing material than the other remaining channels on the respective medium side, in order to provide the heat exchanger with the advantages which are provide by said other brazing material.

The inventors have found that, with regard to strength, only the one uppermost and/or the one lowermost channel are of significance in some embodiments, because the greatest loads will occur there and the strength is therefore to be increased there. This can be the first channel which lies below a cover plate or above a base plate and/or can also be, for example, the second channel, namely depending on the respective medium side which is to be reinforced.

In some embodiments, the uppermost and/or the lowermost channels can also be present on both media sides of the heat exchanger.

According to some other embodiments, there is at least one first part region in all of the first channels or in all of the second channels, in which part region the one brazing material is arranged, and there is at least one second part region, in which the other brazing material is arranged.

Certain aspects of the invention proceed, inter alia, from the knowledge that, for example, a copper-based brazing material which contains almost exclusively copper can provide a higher strength than, for example, an iron-based brazing material which has different other alloy constituent parts.

Tests have shown that no damage caused by dissolution of copper occurred in the connected circuits as a result of the provision of copper brazing substance merely in the upper and the lower channel, which are loaded the most with regard to strength, of the first or the second channels. All of the remaining first or the remaining second channels, which therefore represent the majority of the channels, have namely been equipped with an iron-based brazing material, as in other embodiments. The overall quantity of, for example, copper therefore still remains below a threshold which triggers supposed damage. This also applies to other alternative embodiments where the part regions which are provided with copper brazing substance in the first or in the second channels are relatively small.

One particular exemplary embodiment of a heat exchanger arranges for not providing the uppermost and/or the lowermost channel completely with copper brazing substance, but rather only partially, as a result of which the quantity of copper used is reduced further, but the strength can be increased to a sufficient extent, in comparison with other embodiments. The remaining brazing substance in the upper and/or in the lower channels can be an iron-based brazing substance. In this context, "partially" is therefore to be understood to mean that there are areas in said channels which have the copper brazing substance and other areas in the same channels which are provided with the iron brazing substance.

In a heat exchanger according to an embodiment of the invention, the heat exchanger parts of which, which form the channels, are heat exchanger plates which are stacked inside one another and have two inlets and two outlets, the addressed areas with the copper brazing substance are mainly those which are situated in a region around the inlets and outlets. In contrast, the addressed other areas within the channels which are provided with the iron brazing substance are those areas which are present in a middle plate or channel region between the inlets and outlets.

If the heat exchanger is an oil cooler which is cooled by means of liquid, it is provided in one very particularly preferred exemplary embodiment, in simple terms, to equip all of the channels which are assigned to the oil with the copper brazing material. In the liquid channels, in contrast, the uppermost and/or the lowermost channel are/is provided (partially) with the copper brazing material, whereas all the remaining channels for the liquid are provided completely with the iron brazing material.

The brazed heat exchangers according to an embodiment of the invention comprise, as a first type, what are known as "housingless" heat exchangers, in which the heat exchanger parts are usually configured as trough-shaped plates which are stacked inside one another. Heat exchanger plates of this type have at least four openings which, as has already been mentioned, form four inlet or outlet channels which extend through the stack. One inlet channel and one outlet channel are assigned to in each case one medium. In said first heat exchanger type, all the channels are closed channels. Closed channels are those which are closed all around by means of connected plate edges.

The heat exchangers according to some such embodiments of the invention also include those of a second type which has a housing, in which the stack is arranged. As heat exchanger parts, said stack has tubes or else plate pairs and fins which form tubes or (as an alternative) lobes, between the tubes or the plate pairs, with closed channels in the tubes or plate pairs and with other, open channels, in which the fins or the lobes are arranged. If the heat exchanger parts are single-piece tubes, in particular flat tubes, they can be closed at their opposite ends by way of crimping or folding, as known in the art.

Open channels are those which are at least partially open on the circumferential side, but are preferably completely open all the way around.

Said heat exchanger parts generally have merely two openings in the plates or in the flat tube walls, which openings form an inlet channel and an outlet channel in the plate stack for the medium which flows through the closed channels. The second medium flows into the housing and subsequently flows through the other channels which are open at least partially all around with the fins or the lobes between the plate pairs, in order to subsequently leave the housing.

Accordingly, the second heat exchanger type is distinguished by way of an alternation in the stack of closed channels with the open channels.

Copper-based and iron-based brazing materials have been addressed up to now. This proposal is not to be restricted thereto, however. Rather, combinations of other known brazing materials or brazing alloys are to be included, it being possible for advantages which are to be attributed to said brazing material alloys to be achieved, for example an improvement with regard to resistance against corrosion, but also further cost reductions, etc. The different brazing materials should lie at least close to one another or be approximately identical with regard to their melting points, as has already been stated.

A heat exchanger according to the invention can also have more than two different brazing materials.

The first and the second medium can be different media or identical media (for example, two oils), but at different temperatures.

BRIEF DESCRIPTION OF THE DRAWINGS

FIG. 8 is an elevation sectional view through a part of a heat exchanger according to another embodiment of the invention.

FIG. 9 is an elevation sectional view through a brazed stack of the heat exchanger of FIG. 8, at a perpendicular orientation to the sectional view of FIG. 8.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1 to 7a and 7b show exemplary embodiments according to the invention of heat exchangers, said exemplary embodiments relating to the type often designated as "housingless" heat exchangers.

Figure 10:
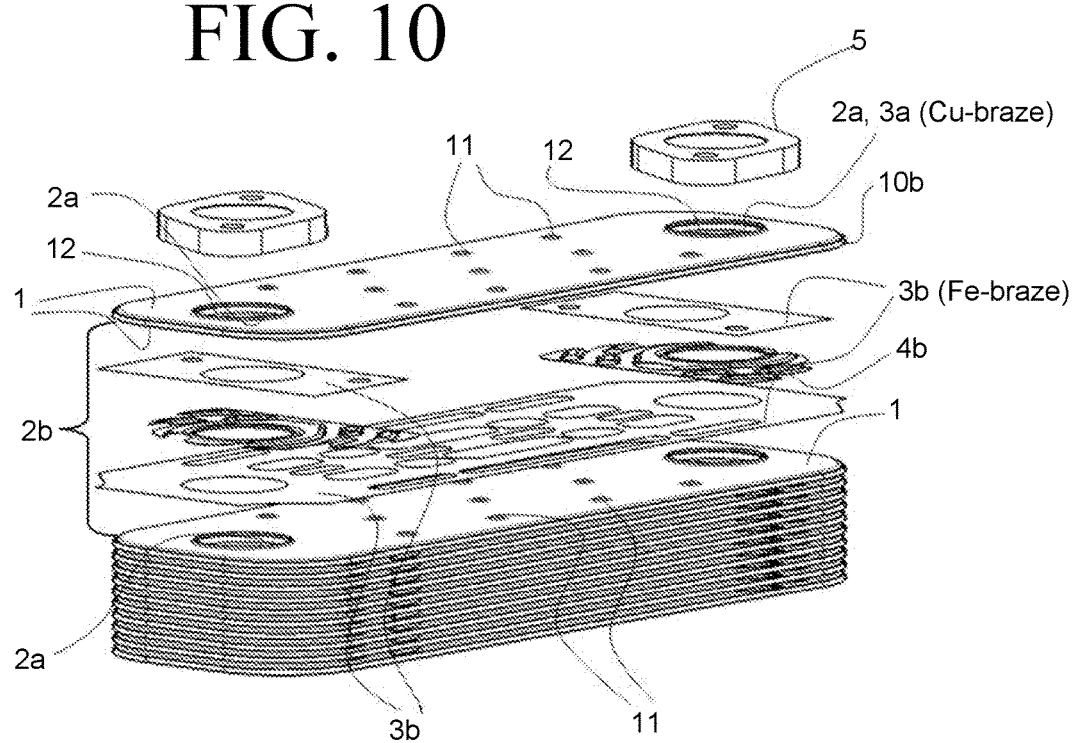
FIG. 10 is a partially exploded perspective view of the brazed stack of FIG. 9.

The illustrations of FIGS. 8 to 10 show different exemplary embodiments of another heat exchanger type, in which the stack is arranged in a housing 30.

Figure 1:
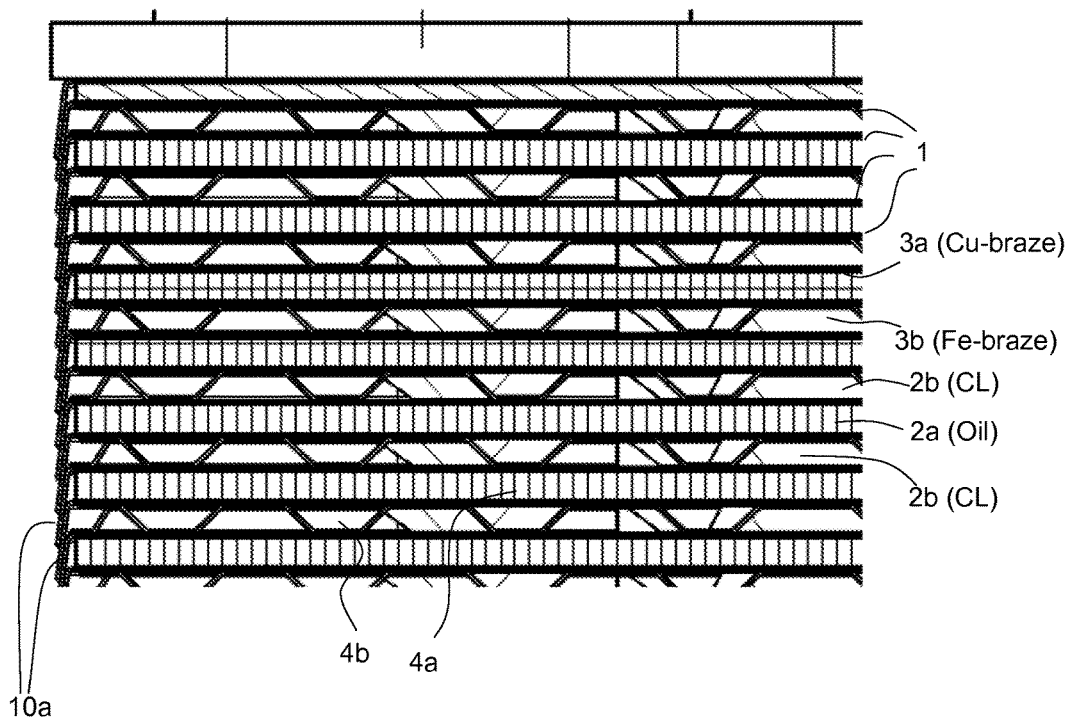
FIG. 1 is an elevation sectional view through a part of a brazed heat exchanger according to an embodiment of the invention.

FIG. 1 can be regarded as a section through a part of a brazed heat exchanger according to the invention.

Figure 2:
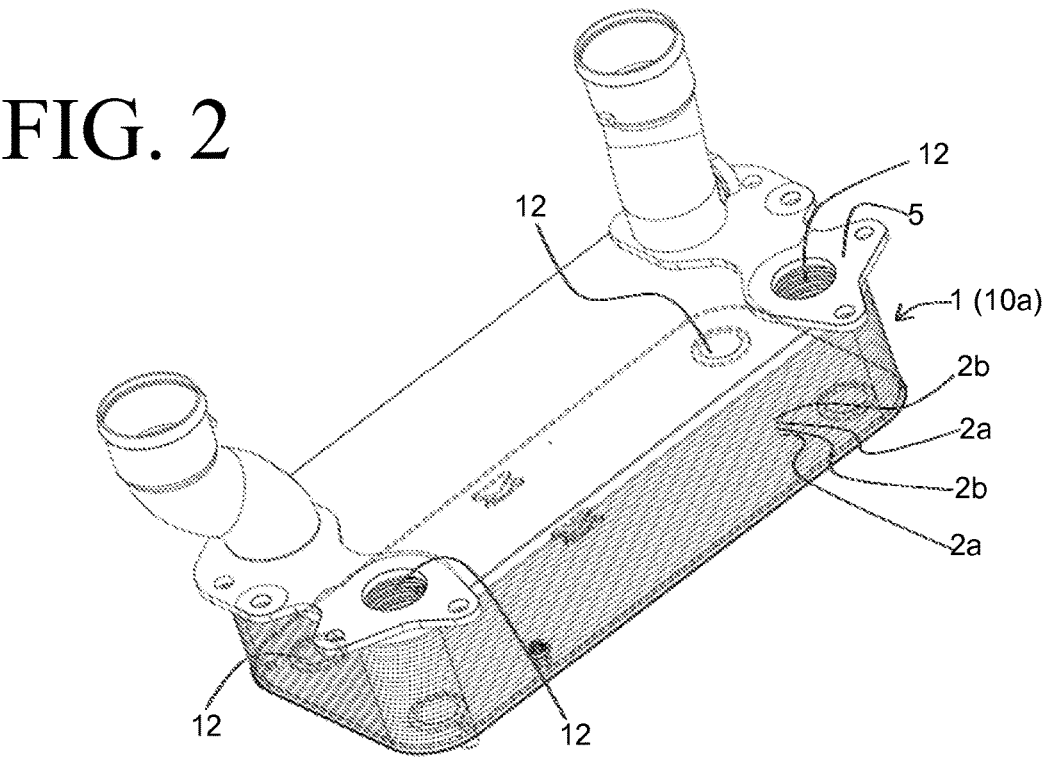
FIG. 2 is perspective view of the heat exchanger of FIG. 1.

FIG. 2 shows a perspective view of the heat exchanger from FIG. 1. The plates 1 have four plate openings 12.

Figure 3:
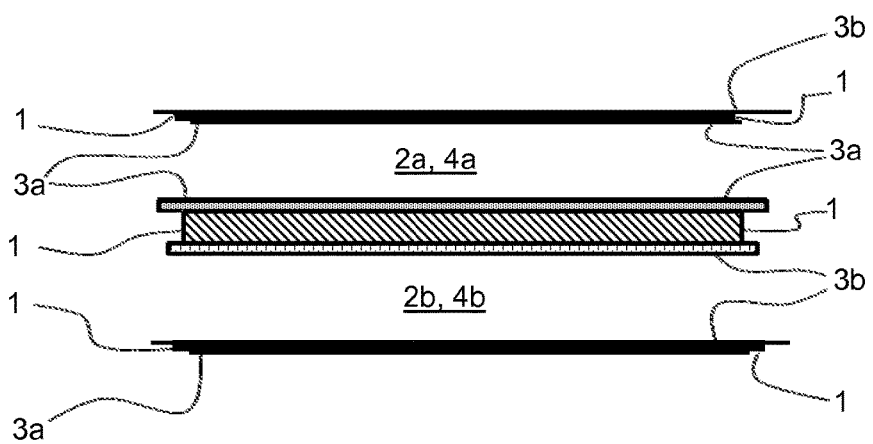
FIG. 3 is a detail of a repeating region of the heat exchanger of FIG. 1, exaggerated in scale to highlight certain aspects of the invention.

FIG. 3 is a highly abstract sketch showing only two of the ducts 2a, 2b of the heat exchanger and three of the plates 1. For this illustration, it can be assumed that the braze materials 3a, 3b are in the form of braze foils. The braze foils can be cut out over a large area such that the braze material 3a, 3b is present only at the contact surfaces (not shown). The contact surfaces are for example those marked by lines in FIGS. 4-6. In this illustration, however, it may alternatively also be assumed that the braze material 3a, 3b is provided in the form of plating.

Figure 4:
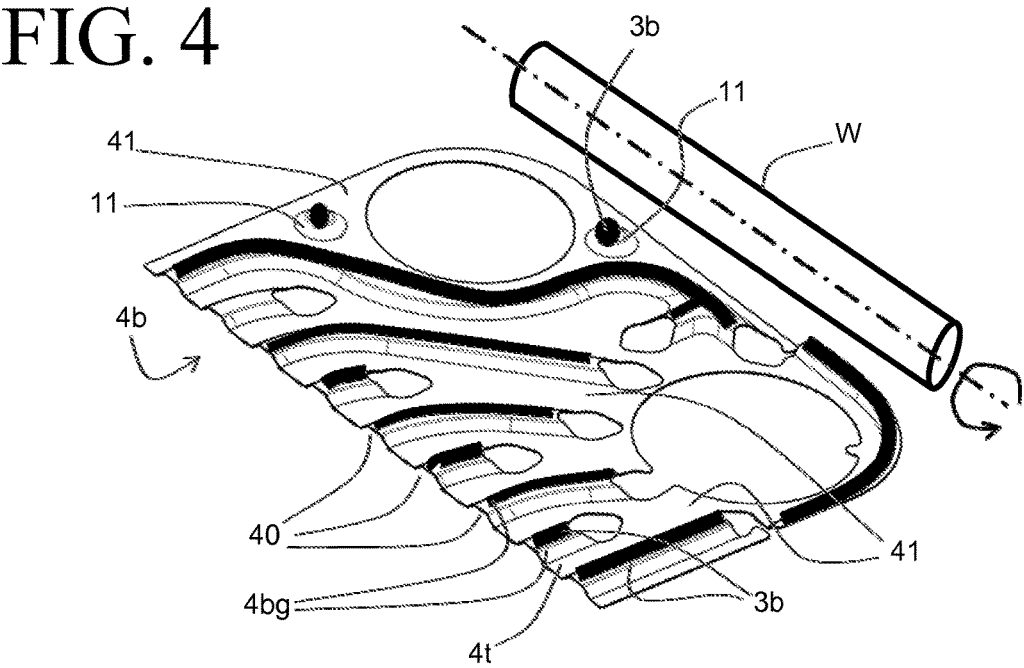
FIG. 4 is a partial perspective view of the top side of a duct sheet used in the heat exchanger of FIG. 1.
Figure 5:
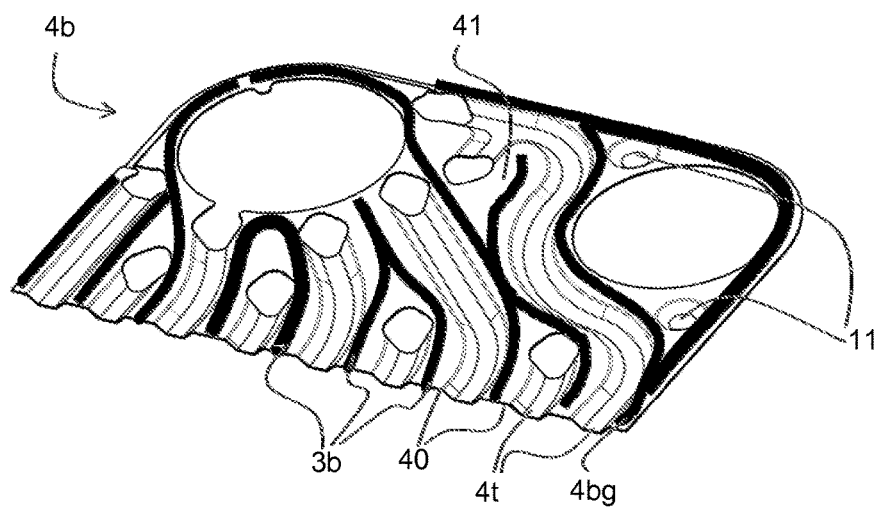
FIG. 5 is a partial perspective view of the bottom side of the duct sheet of FIG. 4.

FIGS. 4 and 5 show an insert in the form of an undulating duct sheet 4b which is situated in one set of ducts 2b. One illustration shows the top side of the duct sheet 4b and the other illustration shows the underside thereof. The braze material 3b, which in this case is applied as braze paste, has been indicated—not in full but predominantly—by the thick lines.

Figure 6:
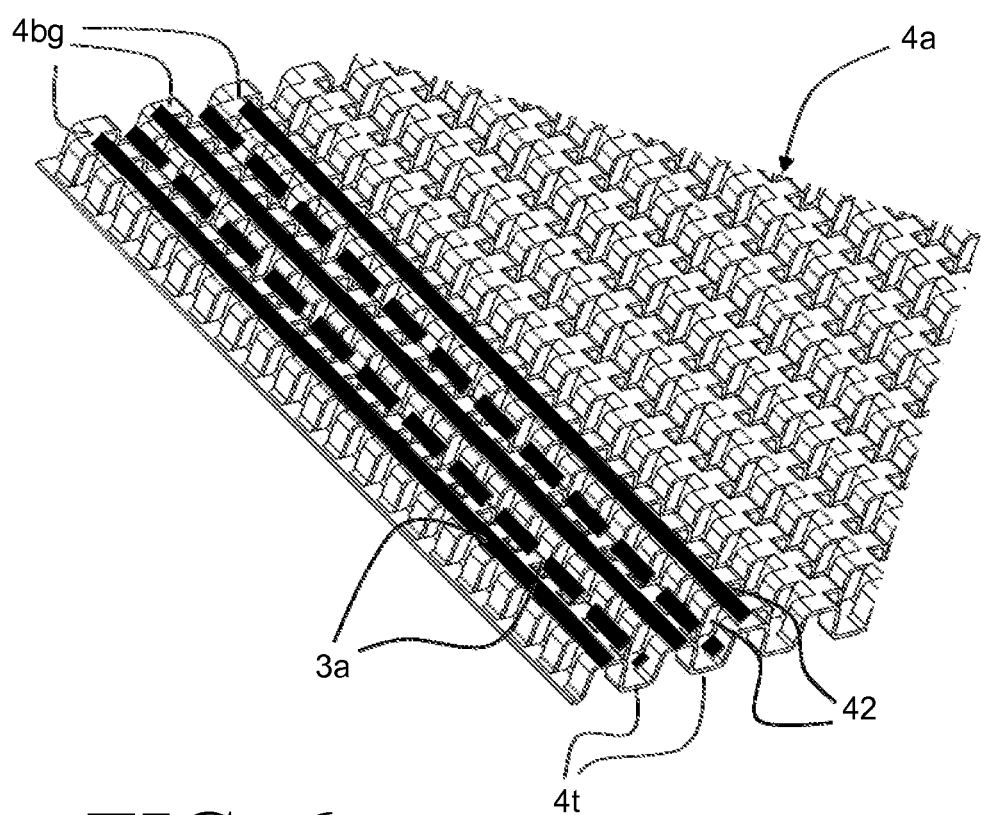
FIG. 6 is a partial perspective view of a fin used in the heat exchanger of FIG. 1.

FIG. 6 shows a detail of an insert in the form of an undulating fin 4a that is situated in the other set of ducts 2a. Here, the other braze material 3a, which is likewise applied in the form of a braze paste, has been indicated by straight thick lines—dashed lines on the underside (not visible in FIG. 6) of the undulation troughs 4t and solid lines on the visible top side of the undulation peaks 4bg.

Figure 7A:
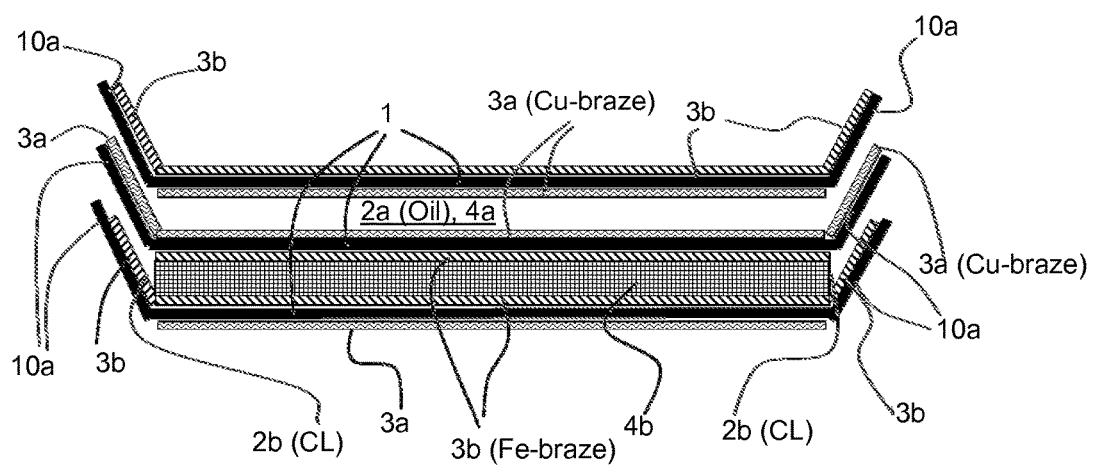
FIGS. 7a and 7b are simplified assembly views of select components of the heat exchanger of FIG. 1.

FIG. 7a shows a further abstract sketch of a possible embodiment on the basis of a duct 2b formed from two plates 1 (still illustrated with a spacing to one another), in which duct there is situated an undulating duct sheet 4b. On the plate edges 10 there is arranged a braze material identical to the respective duct 2a, 2b. Only one of the oil ducts 2a is shown in FIG. 7a, in a somewhat more abstract fashion, above the coolant duct 2b.

Figure 7B:
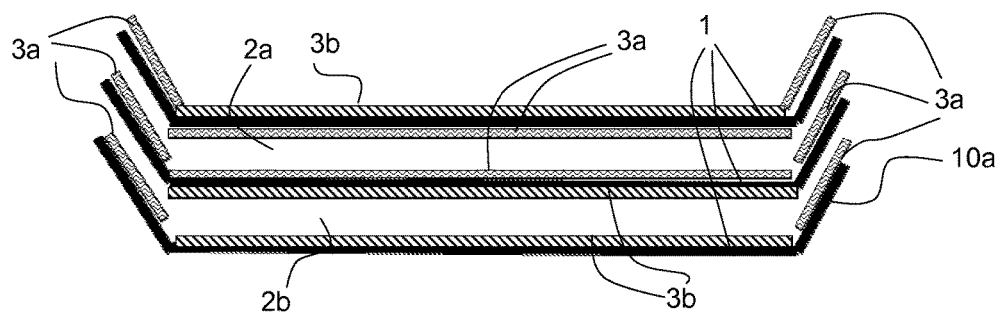

In an embodiment as per FIG. 7b, the braze on the plate edges 10 is—by contrast to that shown in FIG. 7a—identical for all of the plates 1 or for all of the ducts 2a, 2b. On the bent edges 10 of the plates 1 that extend around the entire plate periphery, there is provided a Cu-based braze material 3a. By contrast, a Fe-based braze material 3b is provided on the duct sheet 4b. It is self-evident that all of the ducts 2b that are assigned, in an oil cooler, to a cooling liquid have been designed in the manner of the duct 2b that is shown. By contrast, in the oil ducts 2a of said embodiment that is not shown, the Cu-based braze material 3a is provided both in the oil ducts 2a and also on the associated plate edges 10. It has been found that the relatively small amount of copper on the edges 10 does not result in copper dissolution phenomena.

The undulating duct sheets 4b and the undulating fins 4a are, in an exemplary embodiment that is not shown, of physically identical form, for example designed as shown in FIG. 6.

Other embodiments (not shown) of the "housingless" heat exchanger type have fins or duct sheets only in one set of ducts. In the other set of ducts, protuberances (studs 11) have been stamped into the plates 1, which protuberances bear against and are brazed to one another. Such embodiments will be presented and described further below on the basis of the above-mentioned other heat exchanger type as per FIGS. 8-10.

In embodiments that are not shown, a mix of fins 4a and duct sheets 4b is provided in the ducts 2a and/or 2b. In such cases, the fins 4a and the duct sheets 4b which are situated jointly in one duct should be provided with an identical braze material 3a or 3b. It is also possible for a mix of fins and studs 11 to be provided in each duct 2a and 2b, or else a mix of duct sheets 4b and studs 11.

Further embodiments that are not shown, and which are less preferable, have only protuberances (studs 11) in the plates 1, and therefore no fins 4a or similar inserts whatsoever in the ducts 2a, 2b. In this case, too, the braze materials 3a, 3b are provided only at the said contact surfaces, which of the surfaces on the butting protuberances. The contact surfaces likewise correspond to the brazed connection seams The application of the braze materials 3a, 3b in the form of braze paste may be realized by means of rotating drums W or by means other devices in order that said process can be carried out in an effective manner, that is to say in a manner suitable for mass production. Screen printing methods are also known and suitable for braze application. Owing to the at least two different braze materials 3a, 3b, separate production lines are expedient. Contact between the braze materials should at least be prevented.

FIG. 8 shows a stack of heat exchanger plates 1 arranged in the housing 30. The plates 1 have only two plate openings 12, for example for oil. A flange 5 is situated on the opening 12 of the uppermost plate 1. The housing 30 has an inlet 31 and an outlet 32, for example for a cooling liquid CL. FIG. 9 shows a stack of said type on its own. FIG. 10 shows a stack illustrated in a partially exploded view. The uppermost duct 2b in the stack for the cooling liquid CL has been illustrated in exploded form. Furthermore, in uppermost duct 2a in the stack for oil has been illustrated a plate pair. The braze material 3b in the ducts 2b is, in this example embodiment, inserted in the form of a braze foil. In the other ducts 2a, a braze powder may be applied to the fins 4a situated therein. As shown in the figures, the ducts 2b are predominantly formed with studs 11 which are stamped into the plates 1. Opposite studs 11 are brazed to one another. It is sufficient here for the expensive braze material 3a or 3b to be applied only to the tips of the studs.

Figure 11:
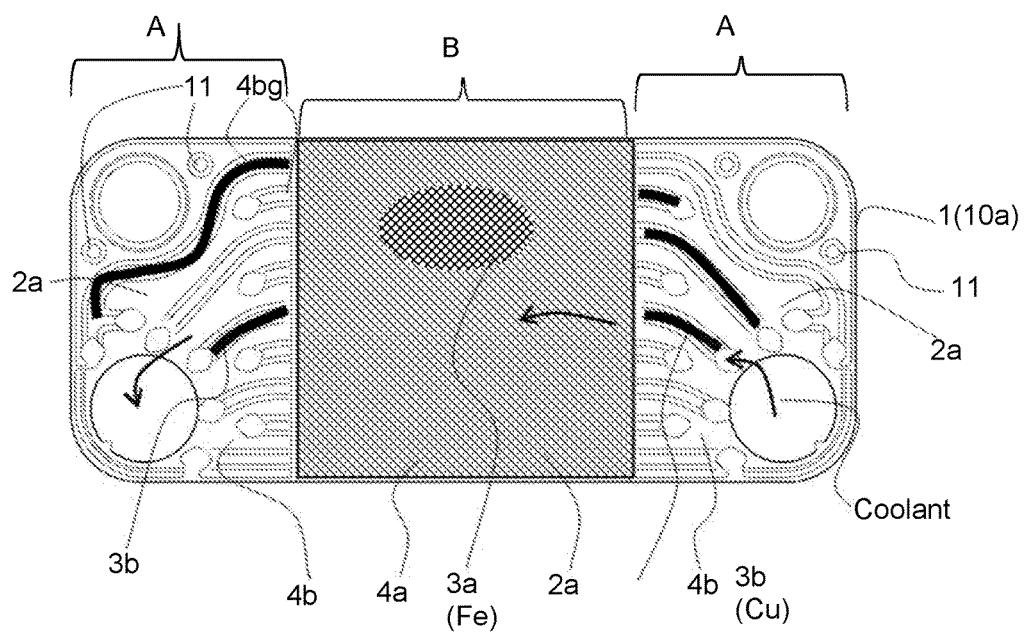
FIG. 11 is a plan view of a flow channel of a heat exchanger according to another embodiment of the invention.
Figure 12:
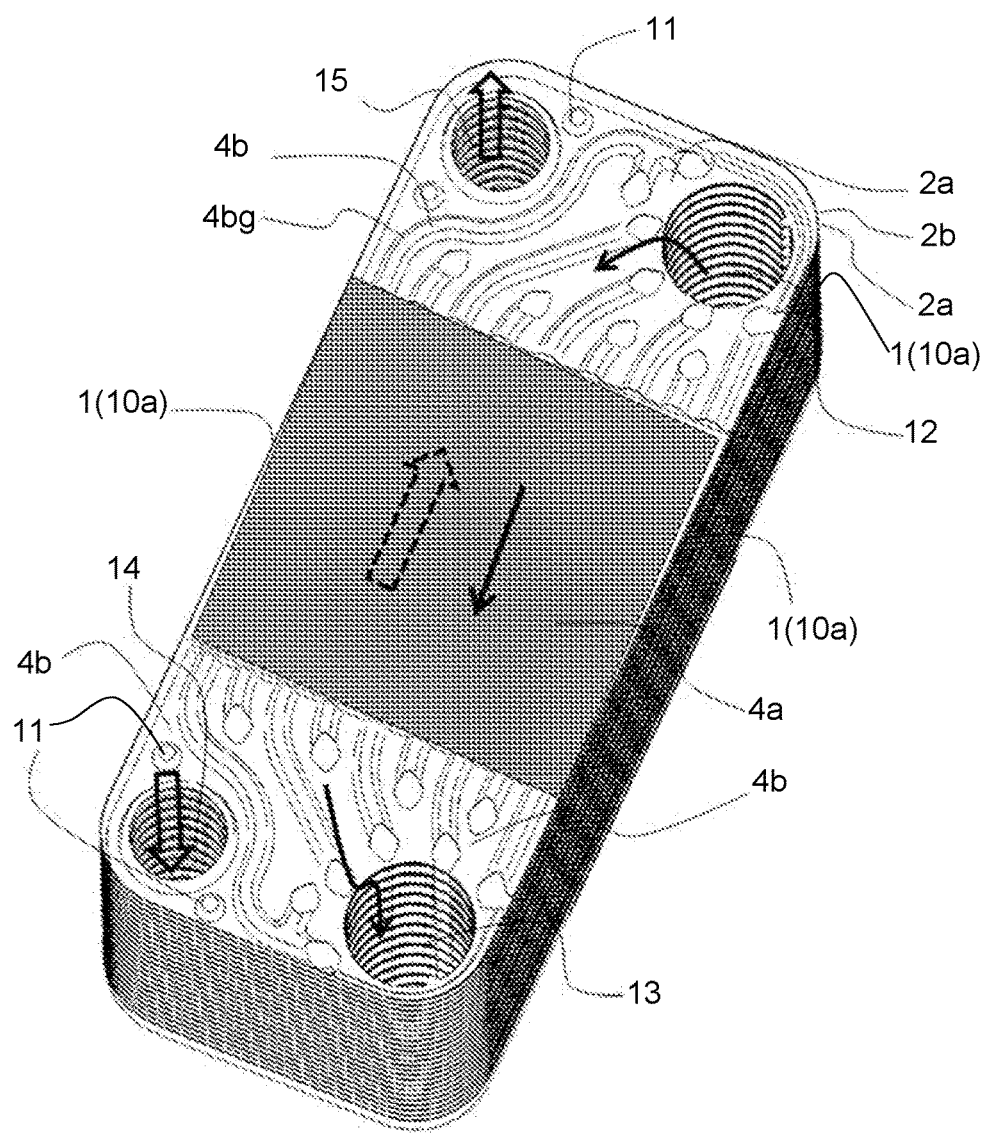
FIG. 12 is a perspective view of the heat exchanger of FIG. 11, with certain parts removed to show the flow channel of FIG. 11.
Figure 13:
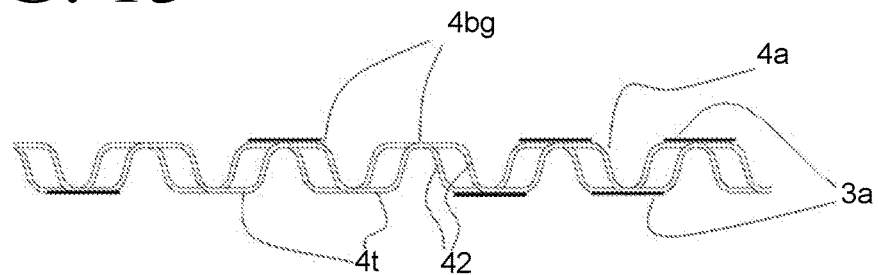
FIG. 13 is a partial elevation view of a fin to be used in the heat exchanger of FIGS. 11-12.
Figure 14:
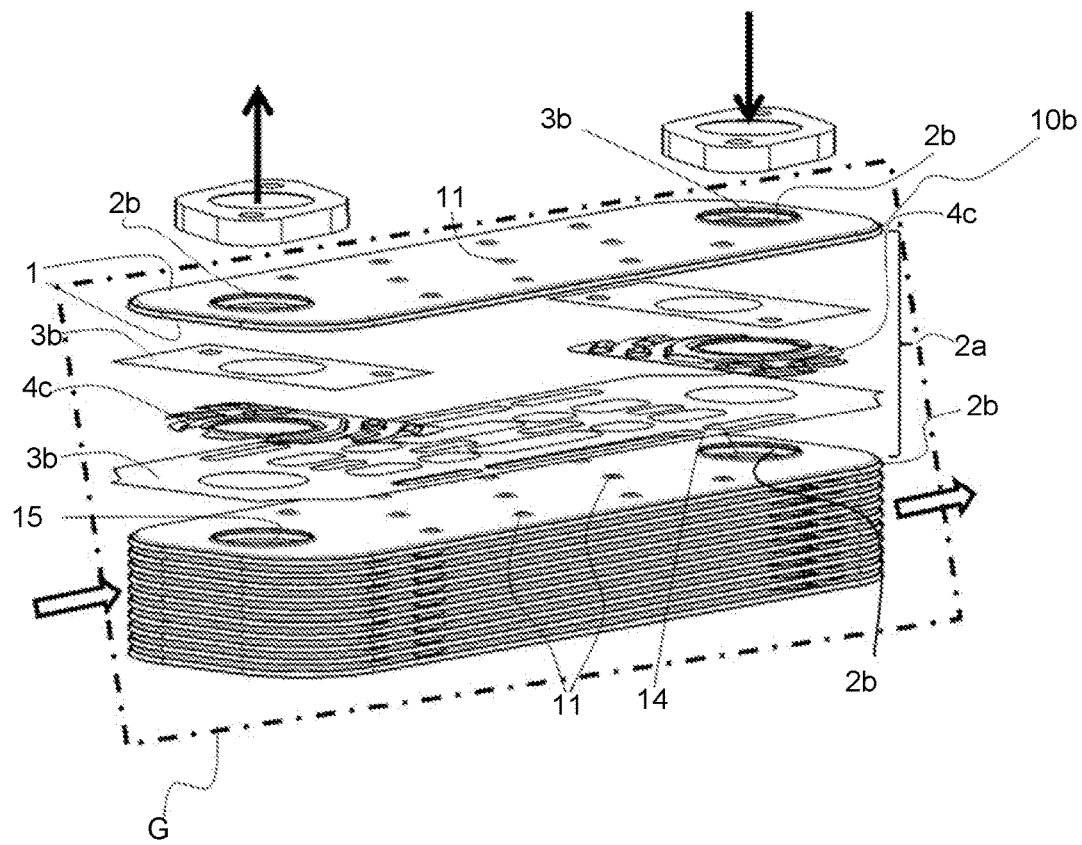
FIG. 14 is a partially exploded perspective view of a heat exchanger according to an embodiment of the invention.

FIGS. 11-13 show another exemplary embodiment using a "caseless" heat exchanger which has exclusively closed channels, similar to the embodiment of FIGS. 1-7. FIG. 14 shows another exemplary embodiment using a heat exchanger in a housing which has closed and open channels, similar to the embodiment of FIGS. 8-10.

FIG. 11 shows a view into an uppermost channel 2a which is preferably a cooling liquid channel. A heat exchanger part 1, in particular a heat exchanger plate 1 with an obliquely raised edge 10a can be seen. The edges 10a of the plates 1 are connected in order to form the closed channels. Four holes are situated in said heat exchanger plates 1. A further heat exchanger plate 1 is laid on top in order to form the liquid channel which is shown. Said further heat exchanger plate (not shown) might also be a cover plate which normally has somewhat thicker walls than a heat exchanger plate 1. The upper left-hand and the upper right-hand hole is a part of an inlet channel and an outlet channel 14, 15, respectively. By means of said inlet and outlet channel 14, 15, the channel 2b (not shown) which is adjacent toward the bottom, preferably an oil channel, is fed. The channels 2a and 2b alternate in the vertical plate stack direction, as is usually customary at any rate. The inlet and outlet channels 12, 13, 14, 15 which are formed in this way are otherwise clearly visible in FIG. 12 which shows a perspective view of the plate stack. The lower right-hand and the lower left-hand hole and the inlet and outlet channels 12, 13 which are formed from them in the plate stack are correspondingly provided for the cooling liquid. It can accordingly be assumed that the cooling liquid flows into the cooling liquid channel 2a which is shown at the bottom right and leaves said channel 2a again at the bottom left (FIG. 11).

Furthermore, as is apparent from FIGS. 11 and 12, in each case one corrugated duct sheet 4b is situated in the upper liquid channel which is shown and preferably also in all other liquid channels of the heat exchanger, on the left and right in the inlet region and in the outlet region of the liquid channel. The corrugated duct sheets 4b have two openings, each of which corresponds with one of the abovementioned holes in the plates 1. The openings are therefore slightly larger than the holes. Furthermore, the duct sheets 4b have arcuate corrugations which firstly lead from the inlet channel to a middle plate region and secondly lead from the middle plate region to the outlet channel. To this end, apertures are arranged in the duct sheets 4b at the ends of the corrugations. Where the corrugations are formed, the liquid can flow between the duct sheet 4b and the lower heat exchanger plate 1. Where the duct sheets 4b are configured without corrugations, that is to say are of planar configuration, the liquid flows between the duct sheet 4b and the upper heat exchanger plate 1. In order to further improve the stability, individual lobes 11 are also present in the corrugated duct sheets 4b.

In the abovementioned middle plate or channel region, a corrugated fin 4a is situated between the two duct sheets 4b, the details of which corrugated fin 4a are shown in FIG. 13.

As is known, the corrugations of the duct sheets 4a4b and the fins 4a have corresponding corrugation peaks 4bg and corrugation troughs 4t. The fin 4a has cuts in the corrugation flanks 42.

All the liquid channels can be of identical configuration with regard to the above-described embodiment.

The following is provided with regard to the brazing materials which are present in FIGS. 11, 12 and 13: a copper brazing material 3b, indicated in FIG. 11 merely by way of some thick, arcuate lines which lie on the corrugation peaks 4bg, is situated on the visible upper side on the corrugations of the duct sheets 4b. By way of this, the brazed connection is produced with the plate 1 (not shown) which lies on the channel 2a. The copper brazing material 3b for connecting to a bottom of the heat exchanger plate 1 which is shown is also situated on the non-visible underside of the duct sheets 4b. The copper brazing material 3b on the underside is situated on the planar areas which lie on the bottom of the heat exchanger plate 1 and which can also be understood to be corrugation troughs 4t.

In contrast, an iron brazing material 3a, indicated merely by way of a single oval in FIG. 11 and by way of some lines in FIG. 13, is situated on the upper side and on the underside of the fin 4a and on its corrugation peaks 4bg and corrugation troughs 4t. Said embodiment applies to the upper channel 2a which is shown and to the lower channel 2a which is not shown.

In contrast, exclusively the iron brazing material 3a is situated in all remaining channels 2a which are assigned to the cooling liquid.

In one exemplary embodiment which is not shown, not only is the uppermost channel 2a configured as described with regard to the brazing materials 3a, 3b, but rather also the following liquid channel 2a.

FIGS. 11 to 13 have not shown the oil channels in detail. The oil channels might be provided completely with a fin 4a (shown in FIG. 13) or might also be of some other configuration. Exclusively the copper brazing material 3b is situated therein in said exemplary embodiment, in order to withstand the high pressure on the oil side.

In FIG. 11, two first part regions A have also been marked which are arranged to the left and the right of a second part region B which corresponds to the abovementioned middle plate or channel region. The part regions A correspond to the likewise abovementioned inlet and outlet regions. In contrast to the above-described embodiment, according to which merely the upper or else also the next following liquid channel is configured with both brazing materials 3a, 3b, all the liquid channels of the heat exchanger are configured with the one and with the other brazing material 3a, 3b in the alternative embodiment. The copper brazing material 3b is therefore situated in the two part regions A and the iron brazing material 3a is situated in the second part region B. Exclusively the copper brazing material 3b is also situated in all the oil channels here.

FIG. 14 shows the oil channels there in somewhat greater detail. They are situated within tubes which are formed in this exemplary embodiment from pairs of plates 1 which are connected at their plate edges 10b and which therefore produce in each case one closed channel (first channel 2a). In contrast to the previous exemplary embodiment, said plates 1 have merely two openings. In each case one open channel (second channel 2b) is situated between the tubes. The housing G which is present in said exemplary embodiment and in which the stack according to FIG. 4 is situated has been indicated as a dashed-line frame, but can in general be similar to the housing 30 of FIG. 8. The open channels are flowed through by a cooling liquid which enters into the housing G and leaves the housing G again after having flowed through the open channels. The cooling liquid has been symbolized by way of block arrows and the oil by way of line arrows in FIG. 14.

Exclusively a copper brazing material 3b is also situated within the oil channels in said exemplary embodiment.

In each case in this embodiment, two other duct sheets 4c are situated in the open channels. In contrast to the previous exemplary embodiment, the said other duct sheets 4c have merely a single opening. They are also of corrugated configuration, however, in order that they can be flowed through just like the duct sheets 4b of the previous exemplary embodiment. The opening corresponds with one of the abovementioned two plate openings. A copper brazing material 3b is situated in the upper, open channel which is shown, whereas an iron brazing material 3a is situated in the remaining other open channels which are not shown in detail. In FIG. 14, the copper brazing material 3b has been shown as a brazing film, without being restricted hereto. It might also be, for example, a brazing paste or a brazing coating. The brazing film has been provided with cutouts, in order that the brazing material 3b is present only where it is required, for example in order to connect two lobes 11 which lie opposite one another and are configured in the plates 1, and which in each case protrude into the open channels.

The basic material of those parts of the heat exchangers which are shown in the exemplary embodiments is a stainless steel. In other exemplary embodiments which are not shown, it can be, for example, an aluminum alloy or another metal which can be brazed with correspondingly different brazing materials.

The heat exchangers according to the invention may, aside from being used as oil coolers, be advantageous for all possible applications, in particular for applications in which it is sought to eliminate certain metallic elements, such as in this case copper, for example.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A brazed heat exchanger, comprising:
   stacked plates defining a plurality of ducts for two or more media to flow between the plates, the plurality of ducts including a first plurality of ducts for a first one of the media and a second plurality of ducts for a second one of the media, the first and second plurality of ducts being alternatingly arranged in the stack of plates;
   a first braze material providing braze joints within a first set of the plurality of ducts; and
   a second braze material different in composition from the first braze material providing braze joints within a second set of the plurality of ducts, the first braze material and the second braze material having matching melting temperature ranges, wherein some of the plurality of ducts are in either the first set or the second set but not both,
   wherein all of the first plurality of ducts belongs to the first set of ducts,
   wherein all of the second plurality of ducts belongs to the second set of ducts, and
   wherein at least one of the most distal ones with respect to a stack direction of the second plurality of ducts additionally belongs to the first set of ducts.

2. The brazed heat exchanger of claim 1, wherein the stacked plates are stacked together to form a plurality of pairs of the stacked plates, plates of each pair of the plurality of pairs being joined together along a periphery of the pair by one of the first and the second braze materials, and wherein successive pairs of the plurality of pairs are joined along the periphery by the first and the second braze materials in alternating sequence.

3. The brazed heat exchanger of claim 1, wherein adjacent ones of the stacked plates are joined along peripheries of the adjacent ones of the stacked plates, and wherein braze joints along all of the peripheries of the stacked plates are formed by one of the first and second braze materials.

4. The brazed heat exchanger of claim 1, further comprising inserts arranged in at least some of the plurality of ducts, wherein each of the inserts is joined to the plates between which the insert is arranged by at least one of the first and second braze materials.

5. The brazed heat exchanger of claim 1, wherein at least one of the ducts includes:
   a sealed periphery defined by edges of a first one of the plates and a second one of the plates, said edges being joined by one of the first and second braze materials; and
   an insert arranged within said duct and joined to both the first one of the plates and the second one of the plates by the other of the first and second braze materials.

6. The brazed heat exchanger of claim 1, wherein at least one of the ducts includes:
   a sealed periphery defined by edges of a first one of the plates and a second one of the plates;
   a first insert arranged within said duct and joined to both the first one of the plates and the second one of the plates by one of the first and second braze materials; and
   a second insert arranged within said duct and joined to both the first one of the plates and the second one of the plates by the other of the first and second braze materials.

7. A brazed heat exchanger for cooling oil, comprising:
   a brazed stack of plates defining alternating oil ducts and coolant ducts;
   oil inserts arranged within the oil ducts and joined to adjacent ones of the plates by way of a first braze material;
   first coolant inserts arranged within the coolant ducts and joined to adjacent ones of the plates by way of a second braze material that is different in composition from the first braze material; and
   second coolant inserts arranged within the coolant ducts and joined to adjacent ones of the plates by way of the first braze material.

8. The brazed heat exchanger of claim 7, wherein the first braze material is a copper-based braze material and the second braze material is an iron-based braze material.

9. The brazed heat exchanger of claim 7, further comprising a housing into which the brazed stack of plates is arranged, wherein the coolant ducts are open to the interior of the housing.

10. A method of making a brazed heat exchanger, comprising:
providing a plurality of plates, each of the plates including a middle portion surrounded by a peripheral portion, the peripheral portion being oriented at at least one oblique angle to the middle portion;
providing a first braze alloy having a first composition to a bottom surface of the middle portion of a first plate of the plurality of plates;
providing a second braze alloy having a second composition different from the first composition to a bottom surface of the middle portion of a second plate of the plurality of plates;
providing the first braze alloy to a top surface of the middle portion of the second plate;
providing the first braze alloy to top surface of the peripheral portion of the second plate;
arranging the plurality of plates into a stack in a stacking direction wherein each plate of the plurality of plates is arranged on either side of a duct to form a plurality of ducts within the stack, and wherein the first plate is arranged adjacent to the second plate; and
heating the stack in a brazing furnace to a temperature that exceeds the melting temperature of both the first and the second braze alloys to at least form braze joints within each duct of the plurality of ducts and between adjacent plates of the plurality of plates.

11. The method of claim 10, wherein at least one of the first and second braze alloys is provided in a form selected from the group consisting of a paste, a powder, a foil, and a plating.

12. The method of claim 10, wherein one of the first and second compositions is a copper-based composition and the other of the first and second compositions is an iron-based composition.

13. The brazed heat exchanger of claim 1, wherein one of the first and second braze materials is a-copper-based braze material and the other of the first and second braze materials is an iron-based braze material.

14. The method of claim 10, further comprising:
providing a plurality of inserts, wherein the plurality of inserts includes a plurality of first inserts;
providing each of the plurality of first inserts within each of a plurality of first ducts of the plurality of ducts; and
providing one of the first ducts at an uppermost location and at a lowermost location relative to the stacking direction to define an uppermost first duct and a lowermost first duct,
wherein the uppermost first duct and the lowermost first duct are each formed between said first plate and said second plate.

15. The method of claim 14, further comprising:
providing the second braze alloy to a top surface of the middle portion of a third plate of the plurality of plates;
providing the first braze alloy to a top surface of the peripheral portion of the third plate; and
stacking the third plate adjacent to the second plate and on the opposite side of the second plate relative to the first plate,
wherein the duct formed between the second plate and the third plate is one of a plurality of second ducts of the plurality of ducts.

16. The method of claim 15, further comprising:
arranging one of the second ducts consecutively with another of the second ducts between the uppermost first duct and the lowermost first duct in the stacking direction.

17. The method of claim 16, further comprising:
arranging at least one of the first ducts between two of the second ducts between the uppermost first duct and the lowermost first duct in the stacking direction.

18. The method of claim 17, further comprising:
providing each of a plurality of second inserts within each of the second ducts.

19. The method of claim 18, further comprising:
wherein each of the plurality of first inserts is a corrugated fin and wherein each of the second inserts is a undulating duct sheet.

20. The method of claim 10, further comprising:
providing a base plate at a lowermost end of the stack in the stacking direction;
providing a cover plate at a uppermost end of the stack in the stacking direction;
providing a plurality of first ducts of the plurality of ducts, each of the first ducts being defined by a first pair of adjacent plates, the first pair of adjacent plates including said first plate and said second plate;
providing the second braze alloy to a top surface of the middle portion of a third plate of the plurality of plates;
providing the first braze alloy to a top surface of the peripheral portion of the third plate;
providing a plurality of second ducts of the plurality of ducts, each of the second ducts being defined by a second pair of adjacent plates, the second pair of adjacent plates including said second plate and said third plate;
arranging a first one of the plurality of second ducts adjacent to one of the cover plate and the base plate;
arranging a second one of the plurality of second ducts adjacent to a third one of the plurality of ducts;
arranging a first one of the plurality of first ducts between the first one of the plurality of second ducts and the second one of the plurality of second ducts; and
arranging a second one of the plurality of first ducts on the opposite side of the second one of the plurality of second ducts relative to the first one of the plurality of first ducts.

* * * * *